United States Patent
Winston

(10) Patent No.: US 10,574,284 B1
(45) Date of Patent: Feb. 25, 2020

(54) CELLULAR TELEPHONE CASE

(71) Applicant: Stephanie Winston, Richmond, VA (US)

(72) Inventor: Stephanie Winston, Richmond, VA (US)

( * ) Notice: Subject to any disclaimer, the term of this patent is extended or adjusted under 35 U.S.C. 154(b) by 0 days.

(21) Appl. No.: 16/247,648

(22) Filed: Jan. 15, 2019

(51) Int. Cl.
| | |
|---|---|
| *H04M 1/00* | (2006.01) |
| *H04B 1/3888* | (2015.01) |
| *A45C 11/00* | (2006.01) |
| *A45F 5/00* | (2006.01) |
| *H04M 1/02* | (2006.01) |

(52) U.S. Cl.
CPC .......... *H04B 1/3888* (2013.01); *A45C 11/00* (2013.01); *A45F 5/004* (2013.01); *H04M 1/0202* (2013.01); *A45C 2011/002* (2013.01); *A45F 2005/006* (2013.01); *A45F 2200/0516* (2013.01)

(58) Field of Classification Search
CPC .... H04B 1/3888; H04M 1/0202; A45F 5/004; A45F 2200/0516; A45F 2005/006; A45C 11/00; A45C 2011/002
USPC ...................................................... 455/575.8
See application file for complete search history.

(56) References Cited

U.S. PATENT DOCUMENTS

| | | | |
|---|---|---|---|
| D566,691 S | 4/2008 | Andre | |
| 7,663,879 B2 * | 2/2010 | Richardson | ........... G06F 1/1613 206/320 |
| 7,912,522 B2 | 3/2011 | Pierson | |
| D726,174 S | 4/2015 | Wahlin | |
| 9,059,777 B2 | 6/2015 | Shattuck | |
| 2002/0153400 A1 | 10/2002 | Chase | |
| 2006/0124676 A1 | 6/2006 | Mastrosimone | |
| 2007/0235493 A1 | 10/2007 | Fortson | |
| 2011/0031160 A1 | 2/2011 | Leggett | |
| 2012/0006868 A1 | 1/2012 | Bever | |
| 2014/0262847 A1 * | 9/2014 | Yang | ...................... A45C 11/00 206/37 |
| 2016/0197636 A1 * | 7/2016 | Brand | .................. H04B 1/3888 455/575.8 |

FOREIGN PATENT DOCUMENTS

GB          2373998          10/2002

* cited by examiner

*Primary Examiner* — Amancio Gonzalez

(57) ABSTRACT

The cellular telephone case is configured for use with a personal data device. The cellular telephone case is a rigid structure. The cellular telephone case forms a protective structure that contains the personal data device. The cellular telephone case comprises a protective case and a lanyard mechanism. The protective case forms the protective structure of the cellular telephone case. The personal data device inserts into the protective case. The lanyard mechanism is a retractable cord contained within the protective case. The lanyard mechanism allows the protective case to be attached to an object.

17 Claims, 3 Drawing Sheets

CELLULAR TELEPHONE CASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including receptacles for a purpose not provided for in A45C01 through A45C09, more specifically, a receptacle for portable handheld communication device. (A45C2011/002)

SUMMARY OF INVENTION

The cellular telephone case is configured for use with a personal data device. The cellular telephone case is a rigid structure. The cellular telephone case forms a protective structure that contains the personal data device. The cellular telephone case comprises a protective case and a lanyard mechanism. The protective case forms the protective structure of the cellular telephone case. The personal data device inserts into the protective case. The lanyard mechanism is a retractable cord contained within the protective case. The lanyard mechanism allows the protective case to be attached to an object.

These together with additional objects, features and advantages of the cellular telephone case will be readily apparent to those of ordinary skill in the art upon reading the following detailed description of the presently preferred, but nonetheless illustrative, embodiments when taken in conjunction with the accompanying drawings.

In this respect, before explaining the current embodiments of the cellular telephone case in detail, it is to be understood that the cellular telephone case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cellular telephone case.

It is therefore important that the claims be regarded as including such equivalent construction insofar as they do not depart from the spirit and scope of the cellular telephone case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
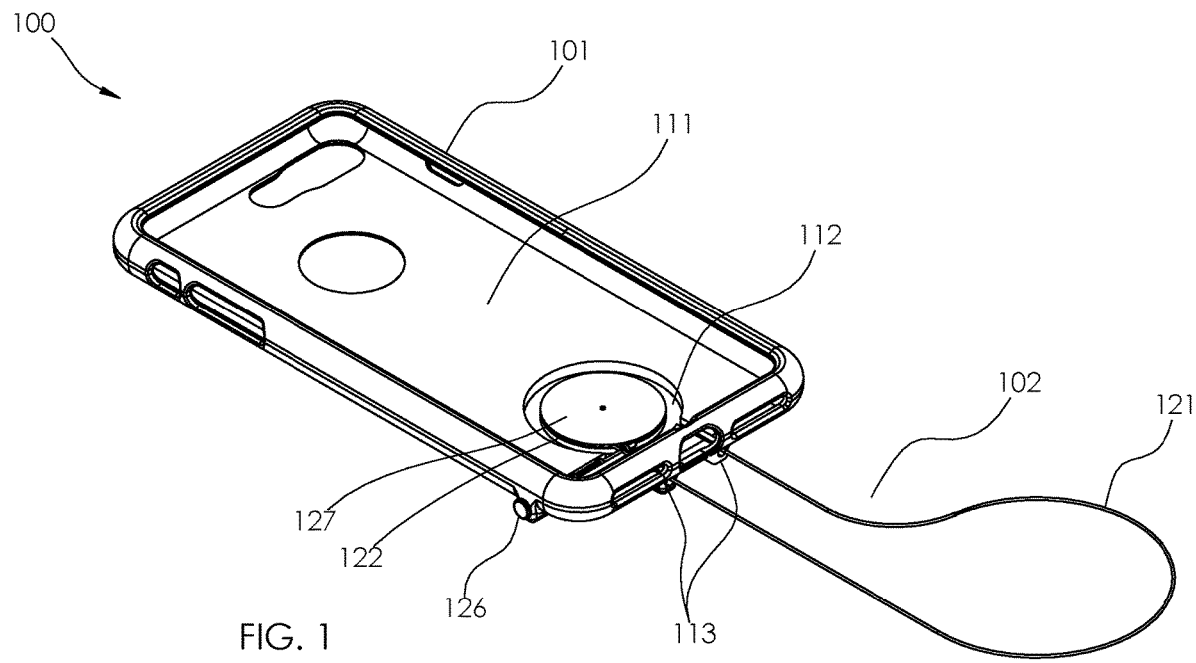
FIG. 1 is a perspective view of an embodiment of the disclosure.
Figure 2:
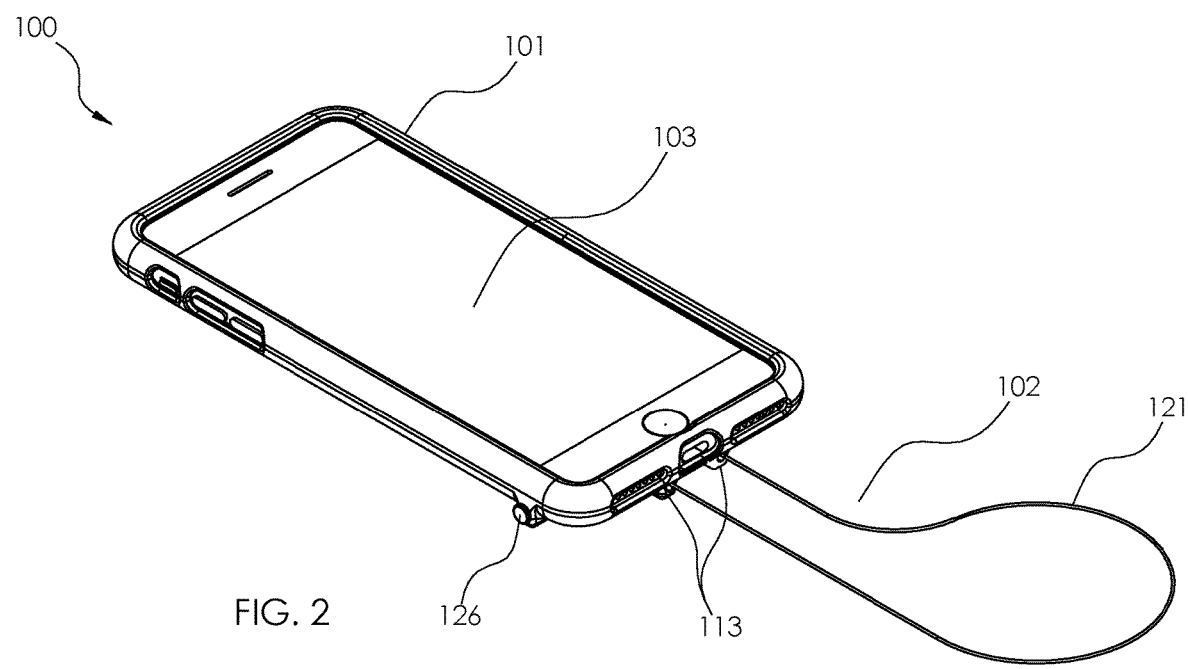
FIG. 2 is an in-use view of an embodiment of the disclosure.
Figure 3:
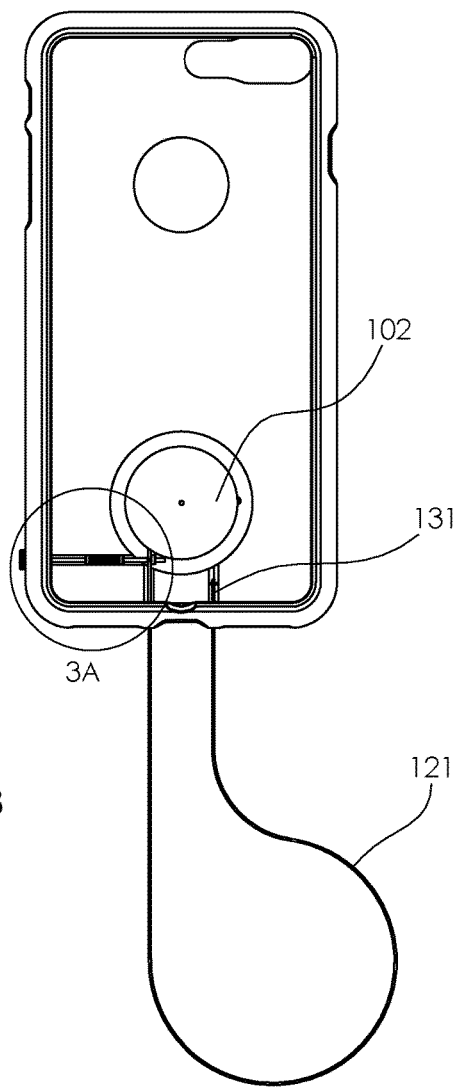
FIG. 3 is a front view of an embodiment of the disclosure.
Figure 4:
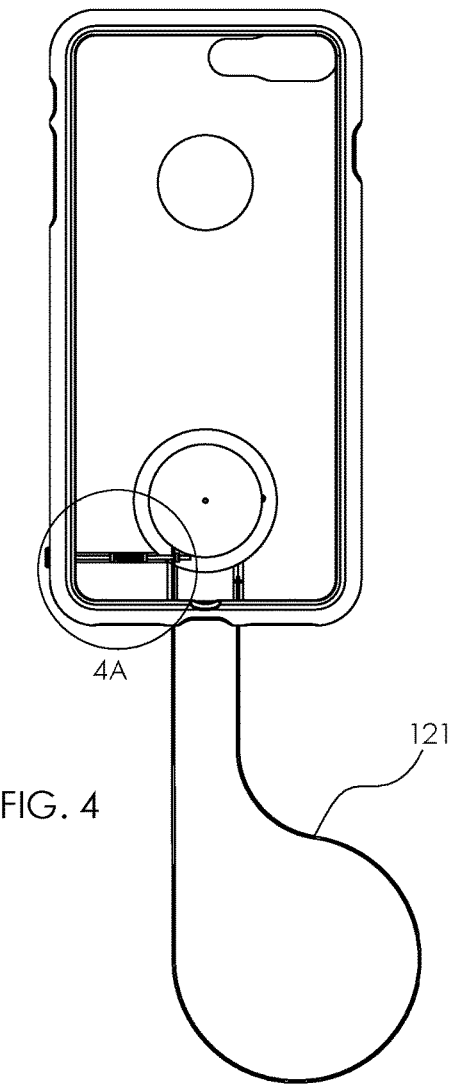
FIG. 4 is a front view of an embodiment of the disclosure.
Figure 3A:
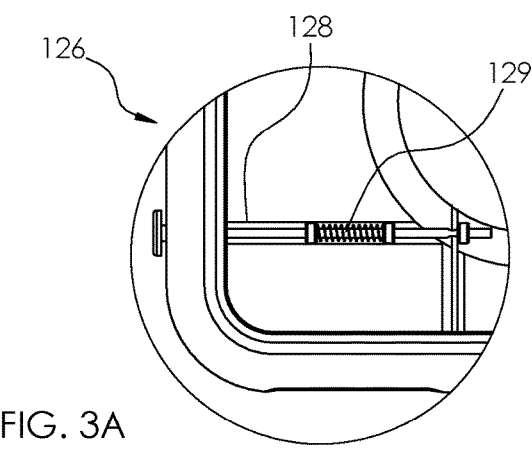
FIG. 3A is a detail view of FIG. 3.
Figure 4A:
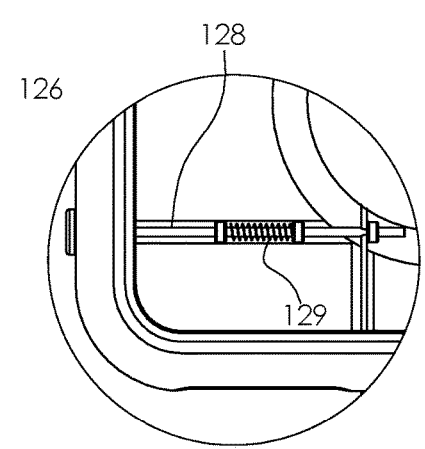
FIG. 4A is a detail view of FIG. 4.
Figure 5:
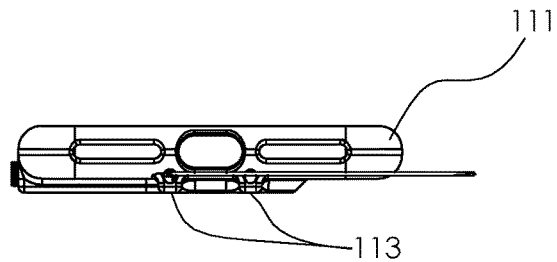
FIG. 5 is a side view of an embodiment of the disclosure.
Figure 6:
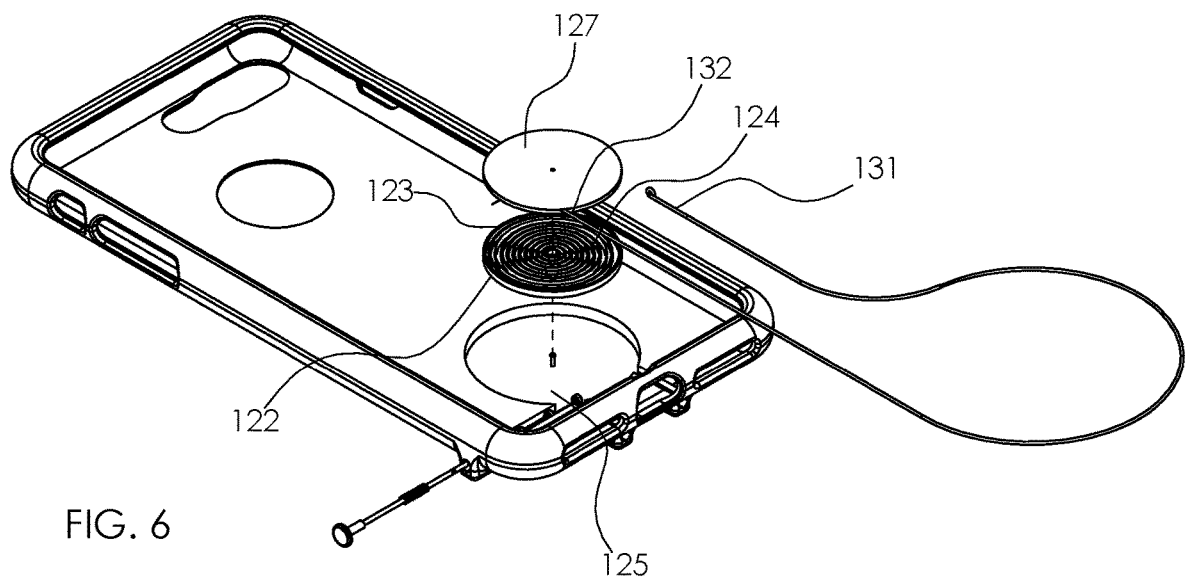
FIG. 6 is an exploded view of an embodiment of the disclosure.

Detailed reference will now be made to one or more potential embodiments of the disclosure, which are illustrated in FIGS. 1 through 6.

The cellular telephone case 100 (hereinafter invention) is configured for use with a personal data device 103. The invention 100 is a rigid structure. The invention 100 forms a protective structure that contains the personal data device 103. The invention 100 comprises a protective case 101 and a lanyard mechanism 102. The protective case 101 forms the protective structure of the invention 100. The personal data device 103 inserts into the protective case 101. The lanyard mechanism 102 is a retractable cord 121 contained within the protective case 101. The lanyard mechanism 102 allows the protective case 101 to be attached to an object.

The personal data device 103 is a programmable electrical device that provides data management and communication services through one or more functions referred to as an application. The application is a set of logical operating instructions that are performed by the personal data device 103. The addition of an application will provide increased functionality for the personal data device 103.

The protective case 101 contains the personal data device 103. The protective case 101 is a rigid structure. The protective case 101 contains the personal data device 103. The lanyard mechanism 102 is formed into the protective case 101. The protective case 101 is formed with all apertures and form factors necessary to allow the protective case 101 to accommodate the use and operation of the lanyard mechanism 102. The protective case 101 is formed with all apertures and form factors necessary to allow the protective case 101 to accommodate the use and operation of the personal data device 103. Methods to form a protective case 101 suitable for the purposes described in this disclosure are well-known and documented in the mechanical arts. The protective case 101 comprises a shell 111.

The shell 111 is a hollow prism-shaped structure. The shell 111 has a disk shape. The shell 111 is a rigid structure. The shell 111 has an open end. The shell 111 is geometrically similar to the personal data device 103 such that the shell 111 fits tightly around the personal data device 103. The shell 111 forms a protective boundary around the personal data device 103 such that the shell 111 will protect the personal data device 103 from impact damage. This disclosure assumes that the shell 111 is formed from a molded plastic. The applicant prefers that the protective case 101 be formed from a polymer selected from the group consisting of a high-density polyethylene (CAS 9002-88-4) and acrylic poly(methyl methacrylic) (CAS 9011-14-7). The shell 111 further comprises a lanyard well 112 and a plurality of cord ports 113.

The lanyard well 112 is a cavity formed in the shell 111. The lanyard well 112 is located in the solid end of the shell 111 that is distal from the open end of the shell 111. The lanyard well 112 is sized to receive and store the lanyard mechanism 102 within the walls of the shell 111. Each of the plurality of cord ports 113 is an aperture formed from the interior space of the shell 111 to the exterior of the shell 111. The plurality of cord ports 113 allows for the threading of a cord 121 associated with the lanyard mechanism 102 through the exterior surface of the shell 111.

The lanyard mechanism 102 is a mechanical structure. The lanyard mechanism 102 is a fastening device. The lanyard mechanism 102 attaches to the protective case 101. The lanyard mechanism 102 allows for the protective case 101 and the personal data device 103 to hang from the neck of a user. The lanyard mechanism 102 is a retractable device. Specifically, lanyard mechanism 102 is stored within the protective case 101 such that the lanyard mechanism 102 is completely contained within the protective case 101 for storage. The lanyard mechanism 102 is drawn from the protective case 101 for use and is then fully retracted back into the protective case 101 after use.

The lanyard mechanism 102 comprises a cord 121, a disk 122, a spool 123, a mainspring 124, a ratchet 125, a release mechanism 126, a lid 127, a shaft structure 128, and a compression spring 129. The cord 121, the disk 122, the spool 123, the mainspring 124, the ratchet 125, the release mechanism 126, the lid 127, the shaft structure 128, and the compression spring 129 are mechanically interconnected.

The cord 121 is a flexible structure formed to have a tensile strength but to have minimal compressive strength. The cord 121 forms the structure from which the protective case 101 suspends. The cord 121 forms a loop which drapes over the neck of a person. The cord 121 is stored within the protective case 101 by being wound on the spool 123. The cord 121 withdraws from the spool 123 of the lanyard mechanism 102 before use. The cord 121 retracts into the spool 123 of the disk 122 after use. The cord 121 is defined in greater detail elsewhere in this disclosure. The cord 121 is further defined with a standing end 131 and a working end 132.

The disk 122 is a container. The disk 122 is a rigid structure. The disk 122 contains the cord 121, the disk 122, the mainspring 124 and a portion of the ratchet 125. The cord 121 is stored on the spool 123 within the disk 122. The disk 122 is formed with all apertures and form factors necessary to allow the disk 122 to accommodate the use and operation of the cord 121. The disk 122 is formed with all apertures and form factors necessary to allow the disk 122 to accommodate the use and operation of the ratchet 125. Methods to form a disk 122 suitable for the purposes described in this disclosure are well-known and documented in the mechanical arts.

The disk 122 is a disk-shaped structure. A first end of the disk 122 structure of the disk 122 comprises an open face. The open face of the disk 122 allows for the installation of the cord 121, the spool 123, the mainspring 124, and a portion of the ratchet 125 into the disk 122. The disk 122 is defined in greater detail elsewhere in this disclosure. The lid 127 is a disk-shaped structure. The lid 127 is geometrically similar to the disk 122. The lid 127 encloses the open face of the disk 122 after the cord 121, the spool 123, the mainspring 124, and the appropriate portions of the ratchet 125 install in the disk 122. The lid 127 is defined in greater detail elsewhere in this disclosure.

The spool 123 is a disk-shaped structure. The cord 121 winds on the lateral face of the disk structure of the spool 123 for storage. The spool 123 is geometrically similar to the disk 122 such that the spool 123 rotates within the disk 122. The spool 123 is defined in greater detail elsewhere in this disclosure.

The mainspring 124 is a torsion spring. The mainspring 124 attaches to the spool 123 such that the mainspring 124 deforms when the cord 121 extends from the protective case 101. The ratchet 125 holds the mainspring 124 in the deformed position. The mainspring 124 returns to its relaxed shape when the ratchet 125 release the mainspring 124. As the mainspring 124 returns to its relaxed shape, the mainspring 124 rotates the spool 123 such that the cord 121 retracts back onto the spool 123. The mainspring 124 is defined in greater detail elsewhere in this disclosure.

The ratchet 125 is a mechanical structure. The ratchet 125 allows for the rotation of the spool 123 and the mainspring 124 in the deformation direction as the cord 121 withdraws from the lanyard mechanism 102. The ratchet 125 prevents the return of the withdrawn cord 121 while the lanyard mechanism 102 is in use. The ratchet 125 is defined in greater detail elsewhere in this disclosure.

The release mechanism 126 is a mechanical interlock attached to the ratchet 125. The release mechanism 126 releases the ratchet 125 such that the mainspring 124 will return to its relaxed shape as the cord 121 retracts. The release mechanism 126 comprises the shaft structure 128 and the compression spring 129.

The shaft structure 128 is an extension apparatus. The shaft structure 128 inserts into the ratchet 125 such that the ratchet 125 mechanically locks the mainspring 124 in its deformed state. The removal of the shaft structure 128 from the ratchet 125 allows the mainspring 124 to return to its relaxed shape. The compression spring 129 is an energy storage device formed within the release mechanism 126. The compression spring 129 assists the shaft structure 128 as it exits the ratchet 125.

The mainspring 124, the ratchet 125, and the compression spring 129 are defined elsewhere in this disclosure. Methods to form the described release mechanism 126 are well-known and documented in the mechanical arts. Methods to form the described shaft structure 128 are well-known and documented in the mechanical arts.

The standing end 131 of the cord 121 permanently attaches to the disk 122. The standing end 131 of the cord 121 remains stationary within the invention 100. The working end 132 of the cord 121 permanently attaches to the spool 123. The working end 132 of the cord 121 rotates with the spool 123 and the mainspring 124.

The following definitions were used in this disclosure:

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Compress: In this disclosure, compress means to force into a smaller space.

Compression Spring: As used in this disclosure, a compression spring is a spring that resists forces attempting to compress the spring in the direction of the center axis of the spring. The compression spring will return to its original position when the compressive force is removed.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Copolymer: As used in this disclosure, a copolymer is a polymer formed from two or more repeating molecules (also referred to as monomers).

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. Specifically, the sum of the surface areas of two ends of the prism-shaped object that forms the disk is greater than the surface area of the lateral face of the prism-shaped object that forms the disk. In this disclosure, the ends of the prism-shaped structure that forms the disk are referred to as the faces of the disk.

Extension Apparatus: As used in this disclosure, an extension apparatus is a mechanical structure that is used to extend the span of the distance between any two objects or the reach of a first object towards a second object.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hang: As used in this disclosure, to hang an object is to suspend an object above a surface from above such that the inferior end of the object does not form a significant portion of the load path of the object.

Housing: As used in this disclosure, a housing is a rigid casing that encloses and protects one or more devices.

Inferior: As used in this disclosure, the term inferior refers to a directional reference that is parallel to and in the same direction as the force of gravity when an object is positioned or used normally.

Superior: As used in this disclosure, the term superior refers to a directional reference that is parallel to and in the opposite direction of the force of gravity when an object is positioned or used normally.

Impact: As used in this disclosure, an impact refers to a rapid exchange of momentum between two objects. An impact often refers to a collision between two objects.

Lid: As used in this disclosure, a lid is a removable cover that is placed over an opening of a hollow structure to enclose the hollow structure.

Logical Device: As used in this disclosure, a logical device is an electrical device that processes externally provided inputs to generate outputs determined from a previously determined logical functions. A logical device may or may not be programmable.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can insert through the space formed within the first linear structure. Within this disclosure, the first linear structure is said to loop around the second linear structure.

Mainspring: As used in this disclosure, a mainspring is a spiral torsion spring made of a metal tape. Energy is stored in a mainspring by twisting the spiral tighter. Mainsprings are commonly found in watches. Mainsprings are also commonly referred to as coiled ribbon springs or coiled flat springs.

Monomer: As used in this disclosure, a monomer refers to a molecular structure that bonds to itself in a repeating manner to form a polymer.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Organic: As used in this disclosure, organic refers to a carbon-based chemical structure. A limited number of carbon-based salts are traditionally considered inorganic chemical structures and are excluded from the study of organic chemistry.

PDD: As used in this disclosure, PDD is an acronym for a personal data device.

Personal Data Device: As used in this disclosure, a personal data device is a handheld logical device that is used for managing personal information and communication. Examples of personal data device include, but are not limited to, cellular phones, tablets, and smartphones.

Plastic: As used in this disclosure, plastic refers to a manufactured material formed from a structure selected from the group consisting of a polymer or a copolymer. Unless stated otherwise, this disclosure assumes that the plastic is formed from organic monomers.

Polymer: As used in this disclosure, a polymer refers to a molecular chain that comprises multiple repeating units known as monomers. The repeating unit may be an atom or a molecular structure.

Port: As used in this disclosure, a port is an opening formed in a first object that allows a second object to pass through a boundary formed by the first object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ratchet: As used in this disclosure, a ratchet is a device comprising a pawl or hinged catch that engages the sloping teeth of a wheel or bar permitting motion in one direction only.

Rigid Structure: As used in this disclosure, a rigid structure is a solid structure formed from an inelastic material that resists changes in shape. A rigid structure will permanently deform as it fails under a force.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Shell: As used in this disclosure, a shell is a structure that forms an outer covering intended to contain an object. Shells are often, but not necessarily, rigid or semi-rigid structures that are intended to protect the object contained within it.

Spool: As used in this disclosure, a spool is a cylindrical device upon which a flexible material, including but not limited to a yarn, a cord, or a tape, can be wound. Depending on context, a spool may also contain the flexible material stored upon the spool.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Superior: As used in this disclosure, the term superior refers to a directional reference that is parallel to and in the opposite direction of the force of gravity when an object is positioned or used normally.

Suspend: As used in this disclosure, to suspend an object means to support an object such that the inferior end of the object does not form a significant portion of the load path of the object.

Thread: As used in this disclosure, to thread is a verb that refers to inserting a cord or a webbing through one or more holes.

Torsion Spring: As used in this disclosure, a torsion spring is a mechanical device that stores mechanical energy through an opposing torque when the mechanical device is bent or twisted. The torsion spring will return to its original relaxed shape when the twisting force is removed.

Wind: As used in this disclosure, to wind refers to making a rotational movement that used to: a) load a cord on a spool; or, b) to tighten a torsion spring.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cellular telephone case comprising: a protective case and a lanyard mechanism; a cellular telephone case is configured for use with a personal data device; wherein the cellular telephone case forms a protective structure that contains the personal data device; wherein the lanyard mechanism is contained within the protective case; wherein the lanyard mechanism allows the protective case to be attached to an object; wherein the personal data device inserts into the protective case, wherein the protective case is a rigid structure; wherein the protective case forms the protective structure that contains the personal data device; wherein the lanyard mechanism is formed into the protective case; wherein the lanyard well is located in the solid end of the shell that is distal from the open end of the shell; wherein the lanyard well is sized to receive and store the lanyard mechanism within the walls of the shell; wherein the lanyard mechanism is a mechanical structure; wherein the lanyard mechanism is a fastening device; wherein the lanyard mechanism attaches to the protective case; wherein the lanyard mechanism is stored within the protective case such that the lanyard mechanism is contained within the protective case for storage; wherein the lanyard mechanism allows for the suspension of the protective case and the personal data device.

2. The cellular telephone case according to claim 1 wherein the protective case comprises a shell; wherein the shell is a hollow prism-shaped structure; wherein the shell has a disk shape; wherein the shell is a rigid structure; wherein the shell has an open end.

3. The cellular telephone case according to claim 2 wherein the shell is geometrically similar to the personal data device such that the shell fits around the personal data device; wherein the shell forms a protective boundary around the personal data device such that the shell protects the personal data device from impact damage.

4. The cellular telephone case according to claim 3 wherein the lanyard mechanism comprises a cord, a disk, a spool, a mainspring, a ratchet, a release mechanism, a lid, a shaft structure, and a compression spring; wherein the cord, the disk, the spool, the mainspring, the ratchet, the release mechanism, the lid, the shaft structure, and the compression spring are mechanically interconnected.

5. The cellular telephone case according to claim 4 wherein the shell further comprises a lanyard well and a plurality of cord ports; wherein the lanyard well is a cavity formed in the shell; wherein each of the plurality of cord ports is an aperture formed from the interior space of the shell to the exterior of the shell.

6. The cellular telephone case according to claim 5 wherein the cord is a flexible structure formed to have a tensile strength but no compressive strength; wherein the cord forms the structure from which the protective case suspends; wherein the cord forms a loop.

7. The cellular telephone case according to claim 6 wherein the disk is a container; wherein the disk is a rigid structure; wherein the disk contains the cord, the disk, the mainspring and a portion of the ratchet; wherein the disk is a disk-shaped structure; wherein a first end of the disk structure of the disk comprises an open face.

8. The cellular telephone case according to claim 7 wherein the lid is a disk-shaped structure; wherein the lid is geometrically similar to the disk; wherein the lid encloses the open face of the disk.

9. The cellular telephone case according to claim 8 wherein the cord winds on the spool; wherein the cord is stored on the spool; wherein the cord withdraws from the spool; wherein the cord retracts into the spool; wherein the cord threads through the plurality of cord ports.

10. The cellular telephone case according to claim 9 wherein the spool is a disk-shaped structure; wherein the cord winds on the lateral face of the disk structure of the spool for storage; wherein the spool is geometrically similar to the disk such that the spool rotates within the disk.

11. The cellular telephone case according to claim 10 wherein the mainspring is a torsion spring; wherein the mainspring attaches to the spool such that the mainspring deforms when the cord extends from the protective case.

12. The cellular telephone case according to claim 11 wherein the ratchet is a mechanical structure; wherein the ratchet holds the mainspring in the deformed position.

13. The cellular telephone case according to claim 12 wherein the mainspring returns to its relaxed shape when the ratchet releases the mainspring; wherein the mainspring rotates the spool as the mainspring returns to its relaxed shape; wherein the mainspring retracts the cord back onto the spool.

14. The cellular telephone case according to claim 13 wherein the release mechanism is a mechanical interlock attached to the ratchet; wherein the release mechanism releases the ratchet such that the mainspring will return to its relaxed shape.

15. The cellular telephone case according to claim 14 wherein the release mechanism comprises the shaft structure and the compression spring; wherein the shaft structure is an extension apparatus; wherein the compression spring is an energy storage device formed within the release mechanism; wherein the shaft structure inserts into the ratchet such that the ratchet mechanically locks the mainspring in its deformed state; wherein the removal of the shaft structure from the ratchet allows the mainspring to return to its relaxed shape; wherein the compression spring assists the shaft structure as it exits the ratchet.

16. The cellular telephone case according to claim 15 wherein the standing end of the cord permanently attaches to the disk; wherein the standing end of the cord remains stationary within the cellular telephone case; wherein the working end of the cord permanently attaches to the spool; wherein the working end of the cord rotates with the spool and the mainspring.

17. The cellular telephone case according to claim 16 wherein the protective case is formed from a polymer selected from the group consisting of a high-density polyethylene (CAS 9002-88-4) and an acrylic poly(methyl methacrylic) (CAS 9011-14-7).

* * * * *